(12) United States Patent
Gere et al.

(10) Patent No.: US 9,467,344 B2
(45) Date of Patent: Oct. 11, 2016

(54) MECHANISM TO DISPLAY GRAPHICAL IT INFRASTRUCTURE USING CONFIGURABLE SMART NAVIGATION

(75) Inventors: Wesley Gere, Austin, TX (US); Olivier Pignault, Leander, TX (US)

(73) Assignee: BMC SOFTWARE, INC., Houston, TX (US)

( * ) Notice: Subject to any disclaimer, the term of this patent is extended or adjusted under 35 U.S.C. 154(b) by 596 days.

(21) Appl. No.: 12/895,284

(22) Filed: Sep. 30, 2010

(65) Prior Publication Data

US 2011/0238691 A1 Sep. 29, 2011

Related U.S. Application Data

(60) Provisional application No. 61/318,148, filed on Mar. 26, 2010.

(51) Int. Cl.
| | | |
|---|---|---|
| G06F 7/00 | (2006.01) | |
| G06F 17/30 | (2006.01) | |
| H04L 12/24 | (2006.01) | |
| G06F 3/048 | (2013.01) | |
| G06F 3/0482 | (2013.01) | |
| G06F 3/0486 | (2013.01) | |
| H04L 29/08 | (2006.01) | |
| G06F 17/00 | (2006.01) | |

(52) U.S. Cl.
CPC ............. *H04L 41/22* (2013.01); *G06F 3/048* (2013.01); *G06F 3/0482* (2013.01); *G06F 3/0486* (2013.01); *G06F 17/30126* (2013.01); *G06F 17/30392* (2013.01); *G06F 17/30539* (2013.01); *H04L 41/0856* (2013.01); *H04L 67/36* (2013.01); *G06F 2203/04803* (2013.01)

(58) Field of Classification Search
CPC .................. G06F 17/30539; G06F 17/30392; G06F 17/30126; G06F 3/048
USPC ........... 707/769, 776, 778, 999.001–999.005
See application file for complete search history.

(56) References Cited

U.S. PATENT DOCUMENTS

| | | | |
|---|---|---|---|
| 7,926,031 B2 * | 4/2011 | Faihe et al. .................... 717/121 |
| 2007/0294307 A1 * | 12/2007 | Chen et al. .................... 707/200 |
| 2008/0005186 A1 * | 1/2008 | Ayachitula ............. G06Q 10/06 |
| 2009/0144319 A1 * | 6/2009 | Panwar et al. ................. 707/102 |
| 2009/0187596 A1 * | 7/2009 | Akiyama et al. ........... 707/104.1 |
| 2009/0313219 A1 * | 12/2009 | Gupta et al. ....................... 707/3 |
| 2009/0319932 A1 * | 12/2009 | Robinson et al. ............. 715/771 |
| 2010/0082701 A1 * | 4/2010 | Maheshwari ................. 707/803 |
| 2010/0306275 A1 * | 12/2010 | Maheshwari et al. ......... 707/803 |

OTHER PUBLICATIONS

BMC Software, "BMC Atrium CMDB 7.6.00 User's Guide—Sep. 2009", © 2006-2007, 2009 BMC Software, Inc.

* cited by examiner

*Primary Examiner* — Kannan Shanmugasundaram
(74) *Attorney, Agent, or Firm* — Brake Hughes Bellermann LLP (57) ABSTRACT

A system allows pre-defining CI scope definitions for use by users of a CMDB system. The pre-defined CI scope definitions may be used to expand a starting CI in a graph displaying a portion of the CMDB according to the types of CIs and relationships between CIs defined in the scope definition. The scope definition is converted into one or more CMDB queries that are restricted to a chain of CIs related to the starting CI. The system restricts the visibility of scope definitions to only those applicable to the starting CI.

19 Claims, 7 Drawing Sheets

MECHANISM TO DISPLAY GRAPHICAL IT INFRASTRUCTURE USING CONFIGURABLE SMART NAVIGATION

CROSS REFERENCE TO RELATED APPLICATIONS

This Application claims priority to U.S. Provisional Application Ser. No. 61/318,148 entitled "A Mechanism to Display Graphical IT (CMDB) Infrastructure Using Configurable Smart Navigation" filed Mar. 26, 2010 and which is incorporated by reference in its entirety herein.

BACKGROUND

This disclosure relates generally to the field of management of information technology (IT) services. More particularly, but not by way of limitation, it relates to a mechanism for displaying portions of a graphical representation of an IT infrastructure modeled by an ITIL®-based (Information Technology Infrastructure Library) Configuration Management Database (CMDB). (ITIL is a registered trademark of The Lords Commissioners of Her Majesty's Treasury acting through The Office of Government Commerce and Central Computer and Telecommunications Agency, United Kingdom.) ITIL-based CMDBs are emerging as a prominent technology for enterprise management software.

CMDBs typically provide a user interface (UI) for graphically displaying IT configuration data in the CMDB. One of the key ways that such UIs interact with the user is to show a graph of IT infrastructure items (computers, software, applications, computer components, etc.) that are connected via various relationships, and allow the user to pick one of the items to expand the graph—that is, to find items connected to it and add them to the graph.

Current tools for retrieving data from a CMDB need more ways to retrieve (and render) the relevant parts of the IT infrastructure stored as Configuration Items (CIs).

Some current products for graphically exploring IT configuration and infrastructure data have knowledge built into the product about the way different types of items can be related together, and which types are likely to be related to which other types. The user does not usually want to see all items related to a particular CI, and all items related to those CIs, etc. Most of the time there are only certain items the user or application wants to retrieve at that moment. In the graphical view, as the user is viewing a graph of IT infrastructure and selects a node to expand (that is, show related items), the user can choose one of several choices of what category of related items to show, which include not only certain types of related items, but also paths traversing through multiple items related in a chain, in a standard configuration. For example, when expanding a computer system, the user can choose to show either "all components" or "network connectivity." Each choice shows items related to the computer system, but each shows different items. The choices available for each type of item are different. For example, a computer system item has different types of items related to it than an application item representing a software application deployed in the IT environment.

With existing products, the knowledge in the system of what types of items can be related together and what choices to make available of the different paths to expand a visual graph around an item are inherent in the product, and cannot be changed easily or in a comprehensive way. In addition, adding entirely new paths, or creating paths for any type of items, including any new item type created by users as a customization, is difficult or impossible.

SUMMARY

A facility for graphically defining a layout or template at design-time (usually by an administrator with knowledge of how data is modeled in the CMDB) which can be associated with a particular item type and conditions (called a "matching pattern") is provided according to various embodiments. The layout is itself a graph that defines how to traverse and query items in the CMDB that can be related to the selected item: directly related items, items related to those items, etc. The matching pattern is separate from the layout (template), but is associated with it. At runtime, when a non-administrative user without much modeling knowledge is exploring in the graphical view, as an item is selected by the user the system attempts to match that item with any of the predefined matching patterns. If there are matches (typically more than one match), the names of each associated layout (template) are displayed to the user or there may be other methods to choose based on the user's role, etc. Once a layout is selected or chosen, the system then queries the CMDB to retrieve the related items corresponding to the selected layout. The system knows how to convert the layout into a CMDB query or set of queries. In one embodiment, the layout defines how to build a graphical query or queries that are qualified to be restricted to a chain of items related to or starting from the selected item.

For each pattern or layout combination, the matching pattern and the layout are distinct entities, associated together by a user or pre-configured in the system. The matching patterns are for determining what layouts (queries) can be used for any given item in the graphical view. Once a layout is selected (by the user or by the system) to expand an item, that query or set of queries is used to find related items according to the query definition, starting only with the given selected item. The search is restricted to items related directly to the selected items (the starting item), and items related to those items, according to the structure of the graph query.

Service models are used to represent services themselves, the applications and composite applications supporting the services, the IT infrastructure running the applications, and hierarchies of services supporting or being composed by other services. Today there is too much effort and cost in creating and maintaining service models using a CMDB. Conventional tools are not aware of the standard structure of various kinds of infrastructure, and do not provide enough aid in searching for and rendering the relevant parts of the infrastructure. Often, the users do not know what to search for to find CIs that are part of a higher-level logical system like a SIEBEL® or SAP® implementation, if they do not already know the host names of the servers, or similar low-level technical identifying information. (SIEBEL is a registered trademark of Siebel Systems, Inc. SAP is a registered trademark of SAP AG.)

Similarly, users who know there is a problem or change concerning a particular server do not have an easy way to find out what other hardware, software, or logical CIs support the same service as the known CI. Conventional tools can clutter the graphical view with extraneous CIs and relationships, and require excessive interaction with and knowledge of the CMDB and related software.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Embodiments disclosed herein may help administrators and operations personnel to create and maintain the service model in a CMDB. This includes making manual tasks more guided, quicker, and easier, as well as automating some currently manual tasks. This may make the CMDB and its UI more useful for datacenter-oriented use cases.

A facility for graphically defining a layout or template at design-time (usually by an administrator with knowledge of how data is modeled in the CMDB) which can be associated with a particular item type and conditions (called a "matching pattern") is provided according to various embodiments. The layout is itself a graph that defines how to traverse and query items in the CMDB that can be related to the selected item: directly related items, items related to those items, etc. The matching pattern is separate from the layout (template), but is associated with it. At runtime, when a non-administrative user without much modeling knowledge is exploring in the graphical view, as an item is selected by the user the system attempts to match that item with any of the pre-defined matching patterns. If there are matches (typically more than one match), the names of each associated layout (template) are displayed to the user or there may be other methods to choose based on the user's role, etc. Once a layout is selected or chosen, the system then queries the CMDB to retrieve the related items corresponding to the selected layout. The system knows how to convert the layout into a CMDB query or set of queries. In one embodiment, the layout defines how to build a graphical query or queries that are qualified to be restricted to a chain of items related to or starting from the selected item.

For each pattern or layout combination, the matching pattern and the layout are distinct entities, associated together by a user or pre-configured in the system. The matching patterns are for determining what layouts (queries) can be used for any given item in the graphical view. Once a layout is selected (by the user or by the system) to expand an item, that query or set of queries is used to find related items according to the query definition, starting only with the given selected item. The search is restricted to items related directly to the selected items (the starting item), and items related to those items, according to the structure of the graph query.

Service models are used to represent services themselves, the applications and composite applications supporting the services, the IT infrastructure running the applications, and hierarchies of services supporting or being composed by other services. Today there is too much effort and cost in creating and maintaining service models using a CMDB. Conventional tools are not aware of the standard structure of various kinds of infrastructure, and do not provide enough aid in searching for and rendering the relevant parts of the infrastructure. Often, the users do not know what to search for to find CIs that are part of a higher-level logical system like a SIEBEL® or SAP® implementation, if they do not already know the host names of the servers, or similar low-level technical identifying information. (SIEBEL is a registered trademark of Siebel Systems, Inc. SAP is a registered trademark of SAP AG.)

Similarly, users who know there is a problem or change concerning a particular server do not have an easy way to find out what other hardware, software, or logical CIs support the same service as the known CI. Conventional tools can clutter the graphical view with extraneous CIs and relationships, and require excessive interaction with and knowledge of the CMDB and related software.

Figure 1:
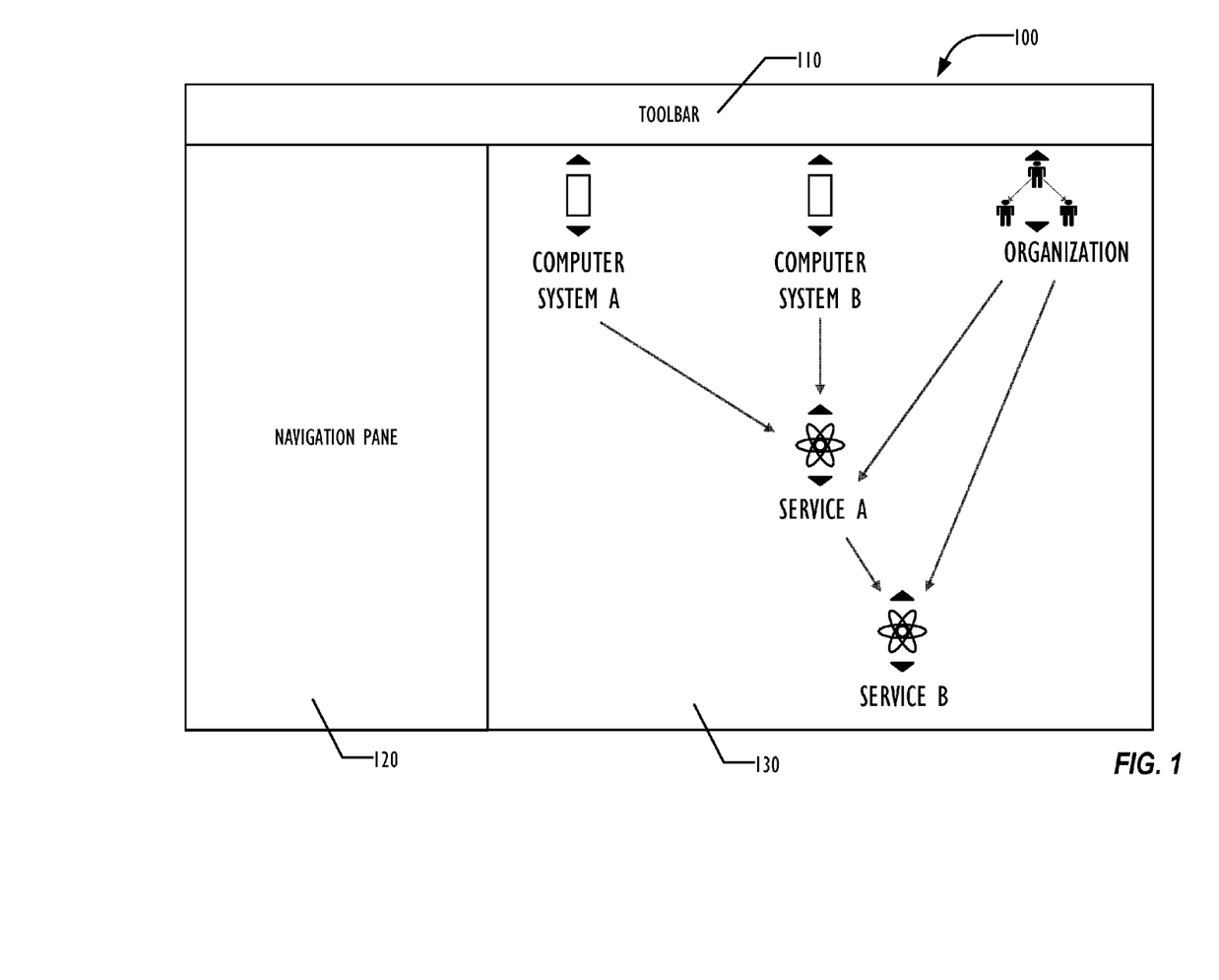
FIG. 1 illustrates, in block diagram form, an example of a graphical UI view according to one embodiment.

In one embodiment illustrated in FIG. 1, a UI 100 for the CMDB allows a user to manage the CI and relationship instances in the CMDB. The user may view, modify, create, and delete those instances. In such an embodiment, the UI 100 is divided into three panes: a toolbar 110, a display pane 130, and a navigation pane 120, as illustrated in FIG. 1.

The toolbar 110 allows the user to change the layout and view of the instances in the display pane 130, and perform other actions. The toolbar 110 may use text, icons, or both to indicate the actions that may be performed by selecting items on the toolbar 110.

The navigation pane 120 enables control over the instances and views that are available in the display pane 130. The navigation pane 120 also enables querying the CMDB for specific instances to add to a view in the display pane 130. In one embodiment, the navigation pane 120 may include a query section 200 and sections related to classes, views, and filters, not shown in FIG. 2 for clarity.

The UI 100 displays CMDB CIs and relationships as a graphical map in the display pane 130. To view the CIs in the user's environment, the user may create a CI or drag one or more instances from a Query section of the navigation pane 120 to the display pane 130. When the user drags an instance to the display pane 130, a message may appear that indicates the result of dragging the instance or the reason why the drag was rejected. The display pane 130 represents CIs as icons, depending on the class of the CI, and relationships between the CIs are represented by directed lines, together forming a relationship graph. In some embodiments, different types of relationships may be indicated by the use of features such as color, line weight, or line pattern. Features not discussed in the present disclosure are omitted from the drawing for clarity.

Each CI may show one or more indicators, such as arrows, indicating that other CIs are related to that instance, either as a parent or as a child of the instance. Selecting an indicator instructs the UI to expand (show) or collapse (hide) the related CIs.

Queries enable finding instances of CIs based on query criteria such as multiple classes, attributes, relationships, and the grouping of query conditions. For example, a query may search for all computer systems in Houston or London that are running the Microsoft WINDOWS XP® operating system. (WINDOWS XP is a registered trademark of Microsoft Corporation.) In one embodiment, the navigation pane may show a list of queries that were installed with the CMDB. For example, the sample queries enable searching for all computers with a specified operating system, or all virtual machines. In one embodiment, the sample queries may be modified or used as a template for creating new queries. The query section of the navigation pane may also include queries that were created and saved by other users.

Queries may include one or more CI classes and their relationships to other CI classes. For example, a query for all computer systems running a particular operating system may include the ComputerSystem CI class, the HostedSystemComponent relationship class, and the OperatingSystem CI class. For each class, one or more query conditions may also be created based on the attributes of that class. For example, a query for computer systems with a particular operating system might include several conditions for the ComputerSystem class (for the Name, ShortDescription, ManufacturerName, and Model attributes) and other conditions for the OperatingSystem class (for the ManufacturerName, OSType, and VersionNumber attributes). These classes and attributes are illustrative and by way of example only.

The term "query" as provided in various embodiments includes the general aspects of 1) defining conditions on CIs to be returned, which can include restrictions that extend to related CIs (it is a graph query); and 2) defining what CIs and attributes are returned in a result graph. Query definitions according to these embodiments may contain more information about related CIs that the user or client wants in the result, beyond what would be considered as the core conditions. These additional conditions may take the form of some links in the query graph being "optional" in the query, which means they do not restrict the CIs to be retrieved on one side even if there are no related matching CIs on the other side.

A CI graph is a graph of CMDB data shown in the display pane 130. A graph query is the graph of nodes in a query definition, shown in a graphical query builder. Each node in a query graph is called a query node and looks similar to a CI in the display pane 130, but actually represents a qualification on the query, defining CI class and attribute qualifications. In the result of an executed query, zero or more CIs may be returned which match that query node. Similarly, each link in a query graph is called a query link and looks like a relationship in the display pane 130, but instead represents a qualification on the query, defining a further qualification on the endpoint query nodes that the CIs matching those nodes be related to each other (as well as defining relationship class and relationship attribute qualifications on the relationship instances). Therefore, in a query result, CIs match query nodes and relationships match query links.

Users may open the UI and quickly navigate to easy-to-find pre-defined named and categorized searches (queries). Results may be shown automatically on a graphical view.

Figure 2:
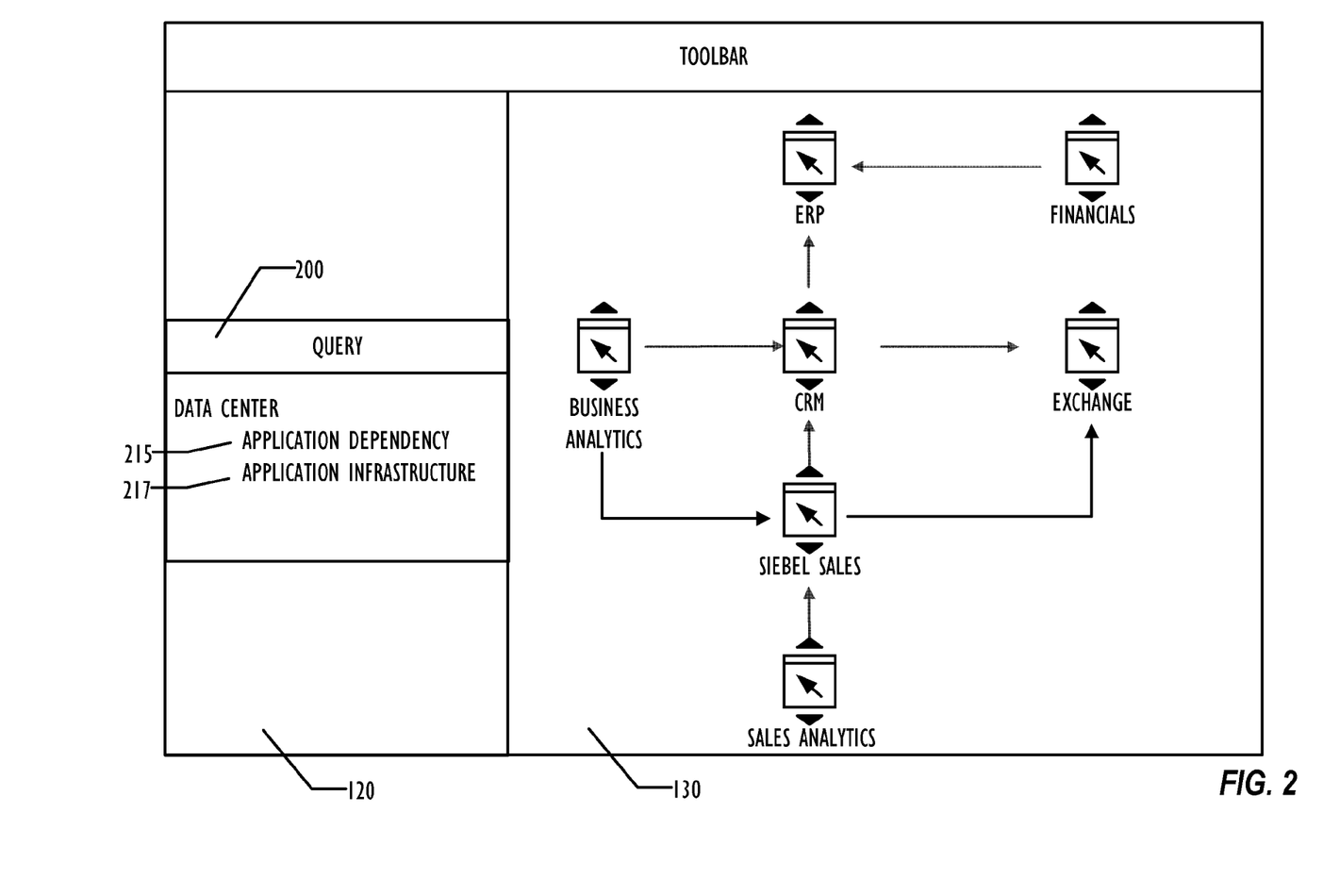
FIG. 2 illustrates, in block diagram form, an example of executing a query according to one embodiment.

FIG. 2 is a graphical view illustrating the result in the display pane 130 of selecting the Application Dependency query 215 in the navigation pane 120 according to one embodiment. In a conventional system, the user would have to select a filter to show only dependency relationships, and then run a query to get all applications, then select all the results in the list, and choose "Add to view." In the embodiment illustrated in FIG. 2, the query itself can define the relationship the user wants to see.

Figure 3:
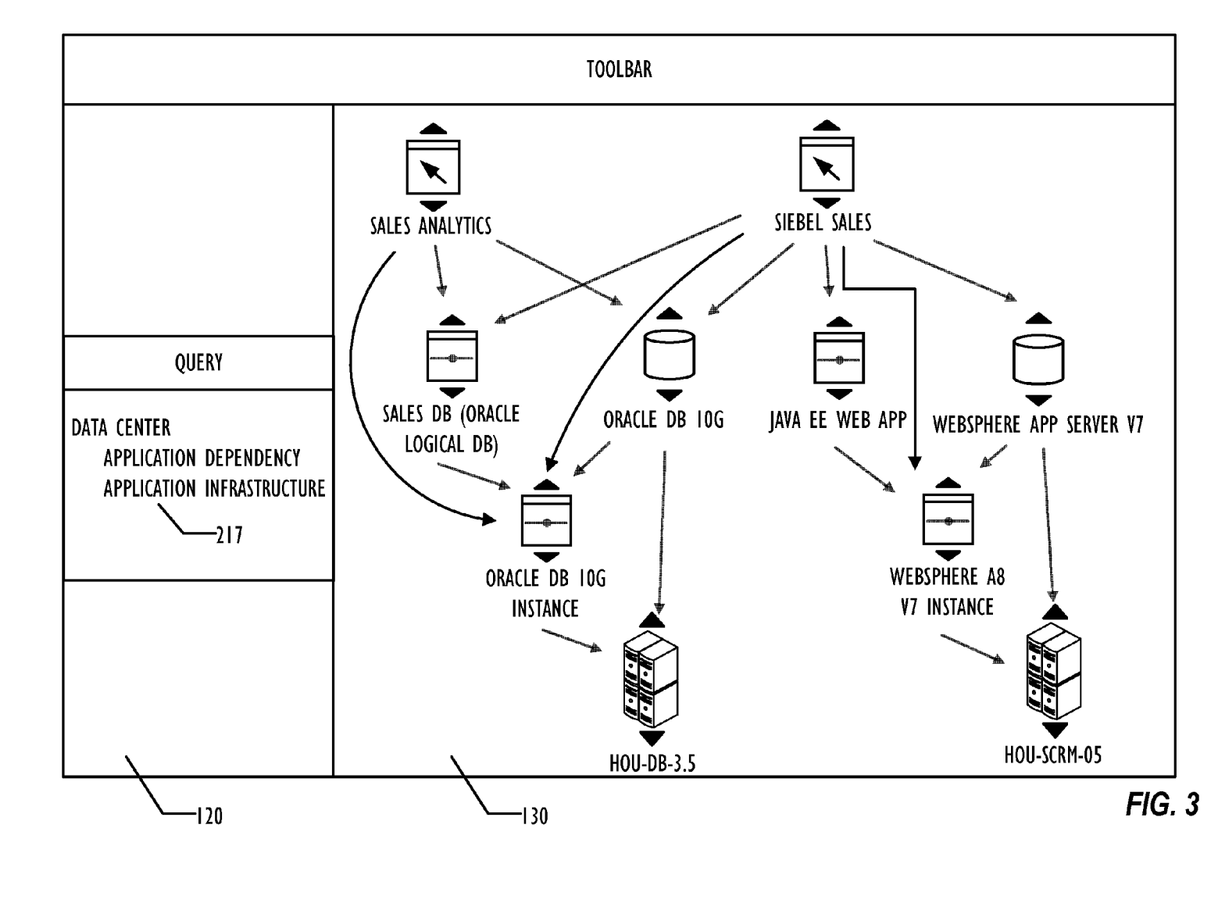
FIG. 3 illustrates, in block diagram form, an example of executing another query according to one embodiment.

In the next example illustrated in FIG. 3, applications are illustrated in display pane 130 with the supporting infrastructure (some of it shared) as a result of executing the Application Infrastructure query 217 from the navigation pane 120. To limit the CIs shown, in one embodiment, a popup may be shown before the query is run to ask the user what applications to show; or in another embodiment, new queries can be customized based on this general query that pre-define conditions on the applications. In yet another embodiment, folding could be used to show only the top layer of the infrastructure until the user chooses a certain CI to expand.

Executing the query only returns the CIs corresponding to the "top" query node in the query graph from the query builder. In one embodiment, the query definition defines an entire graph structure of CIs to be returned. Using "optional links" in the query definition means that the query builder may return related CIs if they are there, but if the related CIs are not there (for example, on the bottom or child side), the CIs matching the node on the other side (the top or parent side) of the link may still be returned.

For queries, CIs to be shown on the graph are only the ones that match the conditions in the pre-defined query definition. With folding, the definition can tell the UI view to hide certain "lower" CIs until the "upper" or "parent" ones are expanded by the user. But only CIs that matched the predefined query conditions are shown. Once the expanding reaches the "end" of the query conditions, a different feature/mechanism may be used to expand the graph further to show CIs that are related to CIs returned from the query, but that are not themselves part of the query results. The conventional method would be that expansion of these "leaf" CIs will bring in all related CIs—but embodiments can improve on the conventional technique by being smart about what related CIs to return, even for expansion of CIs that are leaves in the original query, as discussed below.

In conventional systems, to achieve the same views as in either of the first two examples illustrated in FIG. 2 and FIG. 3 and described above, the user must go through many steps, running queries and then moving them to the graphical view and then expanding CIs to find the related CIs. Filtering may be used to restrict the types of CIs shown, but these are conventionally independent of queries, so the user must know what filter to apply, and the number of filters gets to be almost as large as the number of queries to achieve the same results as in the examples described above. In addition, the filter applies to the entire view—the user may want to be able to "scope" each type of CI that is expanded, in the context of the original query. In one example, a user may want to show served users when a service CI is expanded, but not when a server is expanded (because showing all users with accounts on that server may not be of interest to that user).

In one embodiment, results may be shown in a table whenever the number of CIs to be shown is larger than would be desirably shown on a graph, and individual items may then be selected to be shown on the graph view, still automatically expanding the graph in that case to show the relevant CIs related to the selected item.

As described above, for query results, only CIs that match the pre-defined query conditions are shown. There are cases where the user wants to expand CIs to show related items, but a query cannot help. In one such case, the user is looking at a view showing the results from a query. The user then wants to expand the view starting from a particular CI in the view, but wants to see related CIs that may not be in the results of that query. Commonly this CI will be a "leaf" node in the beginning graph, meaning that the query did not define any scope beyond that CI, but the same could apply to any CI, even in the middle of the result graph.

In another such case, an outside application may interact with the UI to pass in a particular CI to put on a view. In this case, the UI is not in the context of a query, but only has the CI or a set of CIs passed in using just a list of IDs.

On a graphical view showing data from any query or other source, the view can be expanded starting from any particular CI on the view to show related CIs using one of several techniques. The set of CIs shown when expanding starting from a CI is called a scope for that starting CI.

In one embodiment, predefined views may be expanded on the fly with an inherent scoping knowledgebase. Different scoping "views" may be defined and customized by the customer using a "CI scope" configuration UI, which builds a template graph very similar to defining a query.

In such an embodiment, the UI may show "extra" virtual properties of a CI based on a CI scope definition, allowing the presentation of properties from the related CIs alongside the properties of the starting CI, without expanding the view to show the related CIs themselves. Defining this behavior may be part of the CI scope definition. This is a way of giving an abstracted view of a hierarchy of CIs that are closely related.

In addition, the UI may allow expanding views on the fly with general search text (using a preconfigured set of attributes for the search). One embodiment may also provide a folding capability to delay the display of some CIs in the structure until the user expands them.

A CI scope has two main parts: (1) a qualification defining the kind of CI to which this CI scope can be applied; and (2) a view template defining how to expand. In the definition UI, this part looks like much like a query in the query builder.

The qualification part can be thought of as defining a type. Sometimes the type will just be a CI class. Other times it will be a CI class plus a simple attribute qualification like ['PrimaryCapability'="Server"]. But the qualification part may be simple and may only involve qualifications on the starting CI itself, not related CIs.

Using CI scoping, multiple scopes can be configured for the same CI types using the same qualification criteria. Given a CI, the UI can ask the system what CI scopes there are that match the given starting CI (if a given CI matches the qualification part of a CI scope definition, then that CI scope can be said to match the CI). This allows the UI to do smart scoping no matter how the CI got in the view, whether through any arbitrary search or query, or given as a starting point from an embedding or launching another application.

In one embodiment, there is a way to determine which CI scope was used when expanding in the UI, when more than one CI scope definition matches a starting CI selected by the user.

In one embodiment, when users build queries, they can create a query node from a CI scope definition just as they can create a query node from a CI class. The query builder does not import the view template part of the CI scope definition, but will create a node with the same qualification as defined in the starting CI qualification part of the CI scope definition. In addition, for that new node, the query definition stores (remembers) which CI scope definition (Name or ID) it came from, so that at execution time, when the results are displayed in a view, the UI knows to use that CI scope as the default if the user chooses to expand the view from a result CI corresponding to that query node.

In one embodiment, CI scopes may be associated to user roles. In another embodiment, the user may be prompted to choose a CI scope when expanding a view listing the CI scopes that match the selected CI. For example, where a "components" view and a "network" view are both configured for a class of CI, and the user has not narrowed down which view to use by context, the user may be prompted to select either the network or the components view. The network view would show just networking components and the network to which it is connected, and components view would show all the components. Other embodiments may provide a combination of these techniques.

Figure 4:
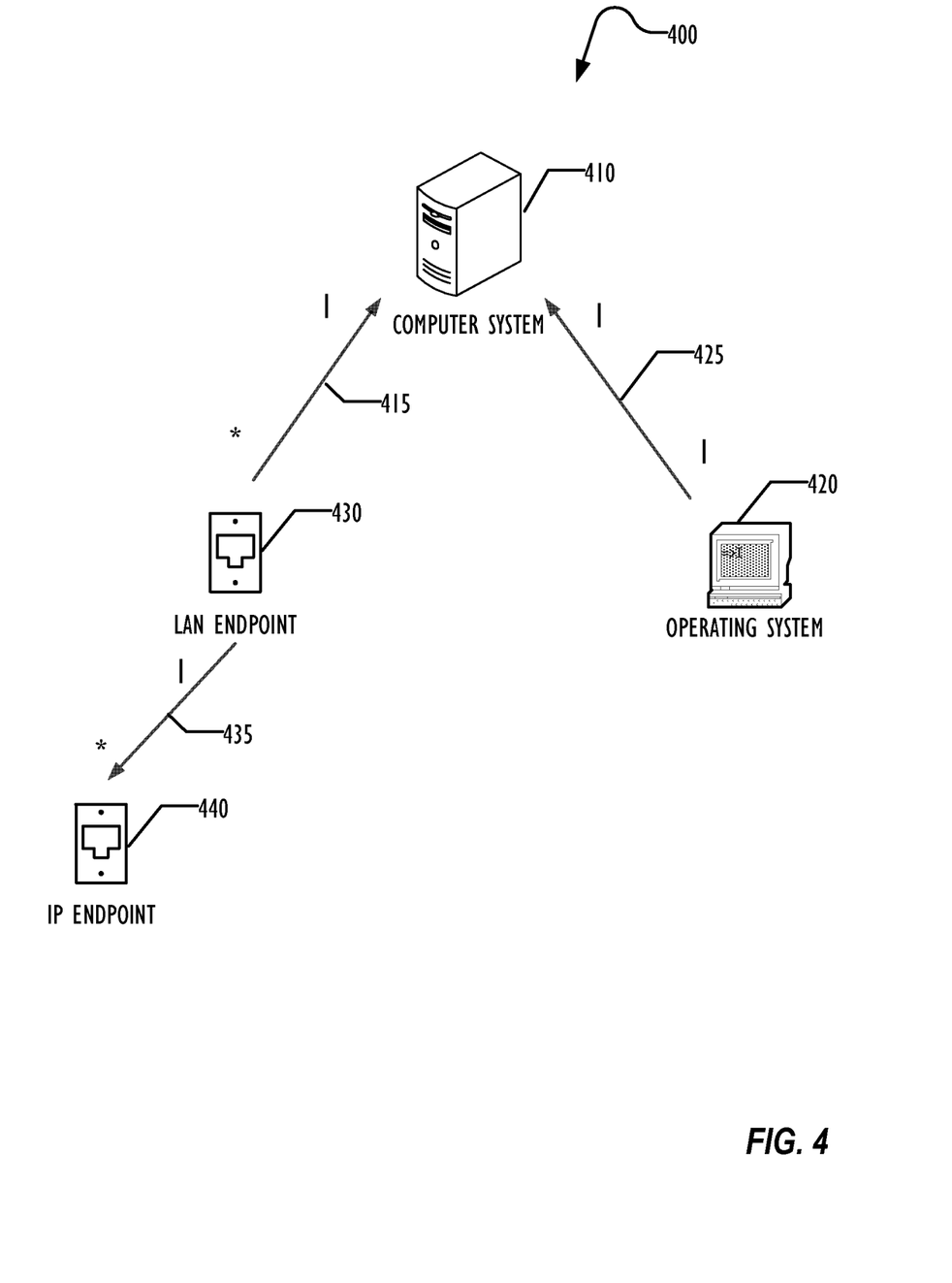
FIG. 4 illustrates, in block diagram form, an example of graphical query according to one embodiment.

In one example, an IT operations group may want to find all servers on a network. The user of the UI may select the types of the CIs to relate: Computer, LAN Endpoint, and LAN, then link them together to match how the data is organized as illustrated in FIG. 4. The user may also limit computer CIs to "server" type (with a capability attribute) and limit the LAN to identify it for only one LAN, leaving no conditions to return all LANs with computers of the right type. The query thus returns all specified LANs and computers, with the computer on top, so that when the query is run, the servers will be listed at the top level and the user can drill down to see endpoints and LANs.

In another use case, the IT group may want to define a scope for a computer system that is a "Server." (Although described herein as a user-defined scope, in most embodiments, this example will be out-of-the-box scope definition.) A single CI type may have multiple CI scope definitions, e.g., all components, network only, etc. Building the scope template looks much like building a query, with certain restrictions. The qualification on the computer system at the top in this example are the starting CI qualification part of the CI scope definition (for example, 'PrimaryCapability'="Server").

Defined scopes may be used to define scopes that are more complex. For example, with the scopes defined above, the IT group may query for services with applications and servers, because "server" is now available as a CI scope that can be added to any query, like any other class.

Thus, embodiments may include one or more of the following features: (1) an enhanced UI allowing the use of scopes; (2) a UI for building queries; (3) UI for building constructs, encompassing the UI for building a query on which to define a scopes; (4) an API for creating and maintaining query and scope definitions; (5) an API for queries (without scopes included in query) which also does scoping; and (6) out-of-the-box queries and scopes.

The following description first covers the use of the queries and CI scopes by end-users doing searches or applications manipulating data. Second, there is a description of how administrators may define (create and modify) the queries and CI scopes.

In one embodiment, the navigation pane 120 may be pre-populated with categorized searches that provide useful views of the IT environment. Each query may provide not only the criteria for the search, information about what related CIs are to be shown on the graphical view, and automatic folding, so that some CIs may be shown right away after executing the search, and others may not be immediately shown, but may be shown by the user expanding CIs visible on the graph to show related CIs that were not initially visible. The query definition itself contains information about what should be shown when expanding CIs.

This feature may reduce the number of interactions required when using the UI to display the information users needs to accomplish their objectives.

The information about what should be shown when querying and expanding is called "scope." Queries are one source of scope.

There is another way that the UI may determine scope in some embodiments, besides what is defined in a query that was run. Many CIs are shown in the UI that are either "leaf nodes" in a query, where no further scope is defined beyond that CI, or the CIs were shown due to some action other than running a query, for example, a CI passed in from a launching application with no context. For those cases, another source of scope is through the definitions of CI scoping. CI scopes are pre-defined scopes (graph patterns very similar to a query) that are associated to a particular CI CMDB class plus other conditions.

The associated type (class plus other conditions) can be thought of as a fingerprint for the CI scope definition. When a given CI matching the fingerprint is expanded in UI, the UI can use the scope of that CI scope definition to expand the graph at the given CI. One feature is that given a CI, the UI may get a list of CI scope definitions for which this CI matches the fingerprint.

In one embodiment, the fingerprint conditions of all CI scope definitions may be parsed into a set of nested fast lookup tables (hash tables), starting with a lookup by class, and then lookups may be performed on attribute conditions within each class for the different CI scope definitions defined with that class as the fingerprint.

CI scope definitions have a predefined (design-time) association of a scope directly to a particular CI or type of CI that makes a CI scope definition different from a query. In one embodiment, a CI scope definition may be referred to inside a query definition to tell the system to use the same CI scope when displaying results from that query, allowing a way to re-use the scope defined previously in a CI scope definition. A CI scope may be associated with a particular CI instead of just a type, using the ID of the CI as the fingerprint for the CI scope.

Along with the attributes from the anchor CI, there are also attributes from other CIs that may be selected in the same way when designing the query or CI scope definition. These may be shown together with no particular way to distinguish the difference. For example, the O/S name can be a "new" attribute on a "server" scope (having computer system as the anchor node), which is actually the name attribute of the operating system CI related to the computer system CI.

For expanding in the views, and for showing a Properties dialog, one embodiment provides a way to pick which scope to use when a CI is the starting CI for more than CI scope, and when this context is not known from the query (adding CI scope definitions in a query). This may involve a pop-up menu for the user to use in making the selection.

A role-mapping ability for preferred scopes may be provided in one embodiment. Alternately, an embodiment may allow users to save their preferred scopes in a configuration setting. Some embodiments may provide both capabilities, and allow users to override their role-based settings.

In one embodiment, if more than one scope is usable, then the user may pick from a list when expanding. Some embodiments may allow a default CI Scope per fingerprint, so the user may optionally expand without extra interaction.

In one embodiment, the query builder uses a tree layout for the nodes and relationship criteria. In another embodiment, the query builder allows building the queries graphically, showing the nodes and relationships somewhat like what the result CIs would look like in the UI.

FIG. 4 is a graph illustrating an example of a graphical query 400 that may be displayed by a graphical query builder according to one embodiment. In this example, the query includes a CI 410 of class "computer system," which has a 1-1 relationship 425 with a CI 420 of class "operating system" and a 1-many relationship 415 with a CI 430 of "LAN endpoint," which itself has a 1-many relationship 435 with a CI 440 of class "IP endpoint." The constraints on the computer system CI 410 at the top of the graph are now the constraints that define the association or matching of the expansion to CIs at runtime. Although not illustrated in FIG. 4, attributes may be defined for the computer system CI 410, such as "Primary Capability=<Server>," which would further constrain the expansion to servers.

In one embodiment, users may choose to add a new node to the graph, and select the class, without selecting the node already on the graph to which the new node should be connected. Based on the class, the system may then find relationship classes that are defined in a Content Data Model (CDM) as having that class as an endpoint. Based on the classes defined in the CDM as the other endpoint of those relationship classes, the UI may automatically show connections to nodes in the graph that satisfy those CDM requirements, and prompt users to select which connection is the one they want. In addition, users may select a node in the graph to which to connect a new node, and the system will find the allowed relationship types, let the users select one, and then show the allowed classes for the new node.

A user may relate two attributes on the same or different nodes together, meaning that the right-hand side of a condition may be an attribute of a node on the graph, unlike conventional UIs that only allow a constant.

The starting node may have a visual indicator visible whenever the query graph is shown. In one embodiment, this visual indicator is the vertical positioning of the starting node in the top swim-lane of the display pane.

Building a CI scope definition may look a lot like building a query. Various embodiments may allow access to the scope-building features by using one or more of: (1) a separate tab on the query builder, (2) a UI mode on the query builder, or (3) a wizard-type UI. These techniques are illustrative and by way of example only, and other UI techniques may be used to allow access to the scope-building features.

One node may be the starting node of a graph, just like a query with one top-level node. All links from the starting node may be required to be optional-type in one embodiment.

As a way of providing re-use and better scoping, and more "nested scope" capabilities, a query may be imported into a query a designer is building. As described below, an "importing query" is one that the designer is defining, to distinguish it from an "imported query."

When importing CI scopes, there is no need to import the whole graph, as just the starting node is sufficient, as long as the connection to the importing query is via the starting node of the imported Scope. The template graph part of the Scope may change without changing the importing query, providing complete nesting ability.

Alternately, the UI may provide an option to import the whole graph, in which case the UI is not importing a scope definition, just copying the template graph. The imported graph becomes part of the new query and is disconnected from the scope definition from which it came.

When one main set of query conditions exist that logically defines a CI definition, but different ways of scoping exist that may be used by different people or at different times, the UI according to one embodiment may be able to create one CI scope definition or query and then save it as a new one, editing the new scope definition or query as needed before saving it.

Figure 5:
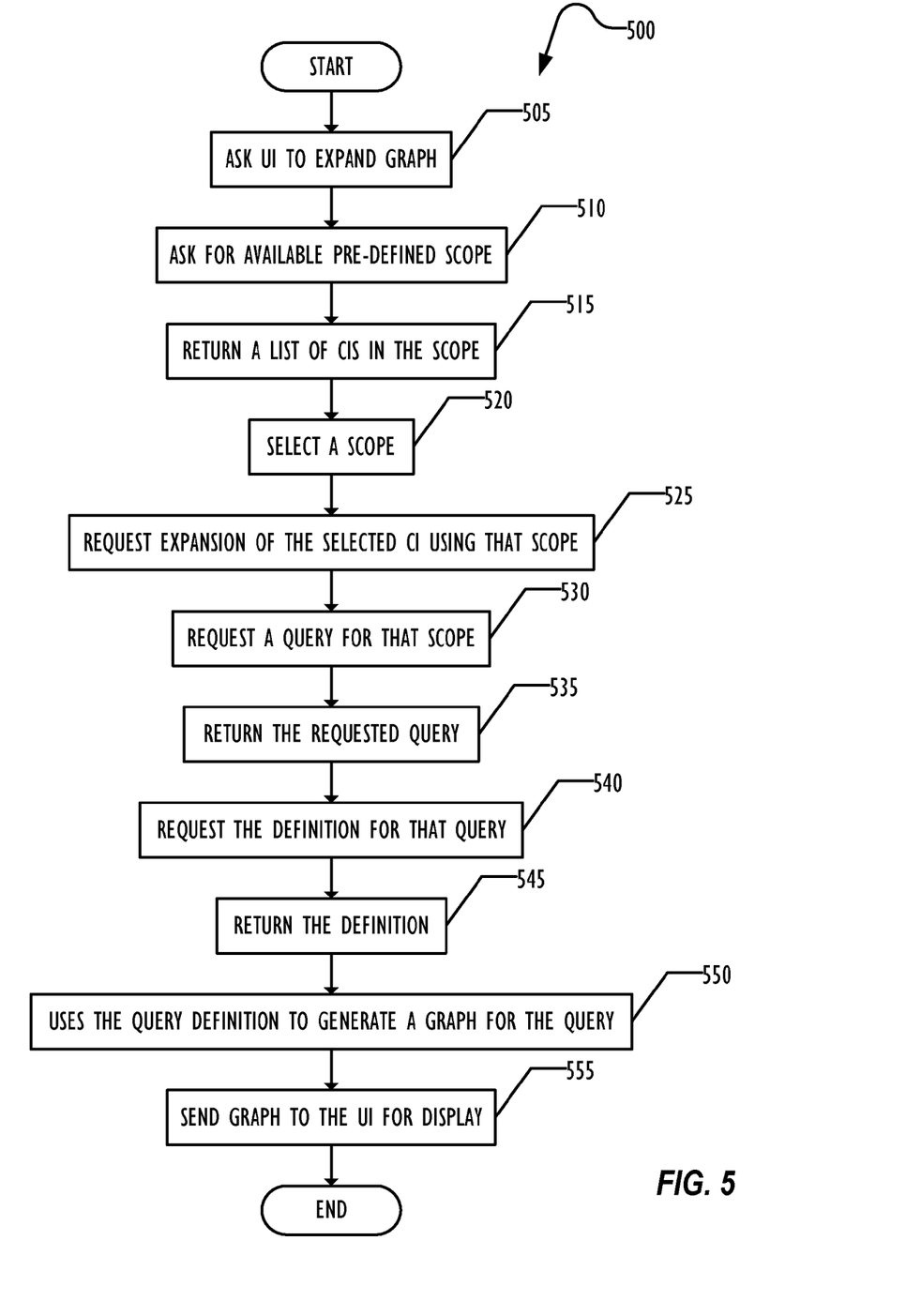
FIG. 5 illustrates, in flowchart diagram form, an example of a technique for expanding the graph as a CI using a scope definition according to one embodiment.

FIG. 5 is a flowchart illustrating a use case 500 in which a user viewing CIs in the graphical display pane wants to expand a CI in the view to show the related CIs. The user may choose to view all related CIs of any type, but the user may also choose among specific views of the CI that may be related to it. These views may be predefined queries that are associated with that type of CI, typically by class, but possibly including simple attribute conditions in addition to the class of the CI. For example, the user may want certain views of a server that is a computer system by class, but is also identified by the attribute Primary Capability as being a server.

In block 505, the user indicates to the UI to expand the graph from a selected CI. The UI may then invoke in block 510 a scope definition manager to get the available predefined scopes for that CI. The scope definition manager in block 515 may return a list of CIs in the scope of the selected CI, which may be displayed to the user. The user may then select a scope in block 520, causing the UI to request expansion in block 525 of the selected CI using that scope from a query engine. In block 530, the query engine may request a query for that scope from the scope definition manager, which returns the requested query in block 535. In block 540, the query engine may request the definition for that query from a query definitions manager, which returns the definition in block 545. The query engine then uses the query definition to generate a graph for the query in block 550, sending the graph to the UI for displaying to the user in block 555.

Depending on the CIs in the CMDB and the query returned from the scope definition manager in block 535, before retrieving the query definition in block 540, the query engine may expand subgraphs for the query.

In one embodiment, the runtime method getScopes(CI) allows the UI quickly to determine the options available to expand the graph starting from any CI in the graph. The UI may call this method whenever a CI is selected, using a root condition consisting of (1) a class key (class name plus namespace); and an attribute condition list, which may be a set of name-value pairs, where the name is an attribute name, and the value is a value for that attribute for which the scope is applicable.

For example, if the user wants a CI scope for servers, the CMDB may have "computer system" as the class, and an attribute called "primary capability," where servers have a value of "server" for the "primary capability" attribute. Then the root condition for this scope would have
ClassKey=ComputerSystem
AttributeConditionList=[(PrimaryCapability=Server)]
Where the parentheses represent a name-value pair (NVP) and the brackets represent a set (in this case, a set of one NVP). At initialization time, the system may read all the CI a definitions and build a programmatic map structure such as this, such as
Map(ClassKey, List(Object[Scope=ScopeID; Conditions=List(NVP(AttributeName, AttributeValue))]))

The same attribute name can appear more than once in the list for a class.

The getScopes(CI) method in one embodiment may apply a fast lookup: (1) from the CI Class Key, look up that class key in the map, (2) iterate over the resulting list of scope/condition items, and for each scope iterate over the list of NVPs, and for each NVP look up the value for the attribute name in the CI data, and see if it matches the attribute value in the NVP. If all of the NVPs match the CI, then that scope is available for that CI.

The UI preferences may be associated with each user and with each role. The combination of user and role preferences may determine the effective preferences. In one embodiment, user preferences may override role preferences. One item in the preferences may be a list of scopes to be used as defaults. The list may be implemented as a list of IDs for fast hash map lookup.

At the time a CI is selected on the graph, and the user chooses to expand the graph from that CI to show related items, the UI displays a list of available scopes. Once the user chooses a scope, the UI will call a method, for example, "expand(CI,scope)" to get the graph of CIs connected (directly and indirectly) to the given CI.

In one embodiment, this is achieved by converting the scope/CI combination into a graph query, which can then be executed like any graph query. The scope definition may contain the query definition to be used, but with one modification. The query definition stored as part of the scope definition may contain a node representing the "root CI," which is meant to be a placeholder for the given CI passed into expand (CI, scope). This placeholder query node may be modified on the fly into an actual query node by the method for converting the scope and CI into a graph query. The actual query node may have, according to one embodiment: (1) the class key qualification specified in the root condition of the scope definition; and (2) a qualification that the ID attribute equals the ID attribute value of the given CI. This restricts the query to retrieve only CIs in a graph related to the given CI. The name-value pairs specified in the root condition of the scope definition are not used in the query in one embodiment.

The definition of the queries and the CI scopes may be stored using a class in a configuration namespace of the CMDB or in any other desired location. In one embodiment, the definitions may be stored as XML.

Figure 6:
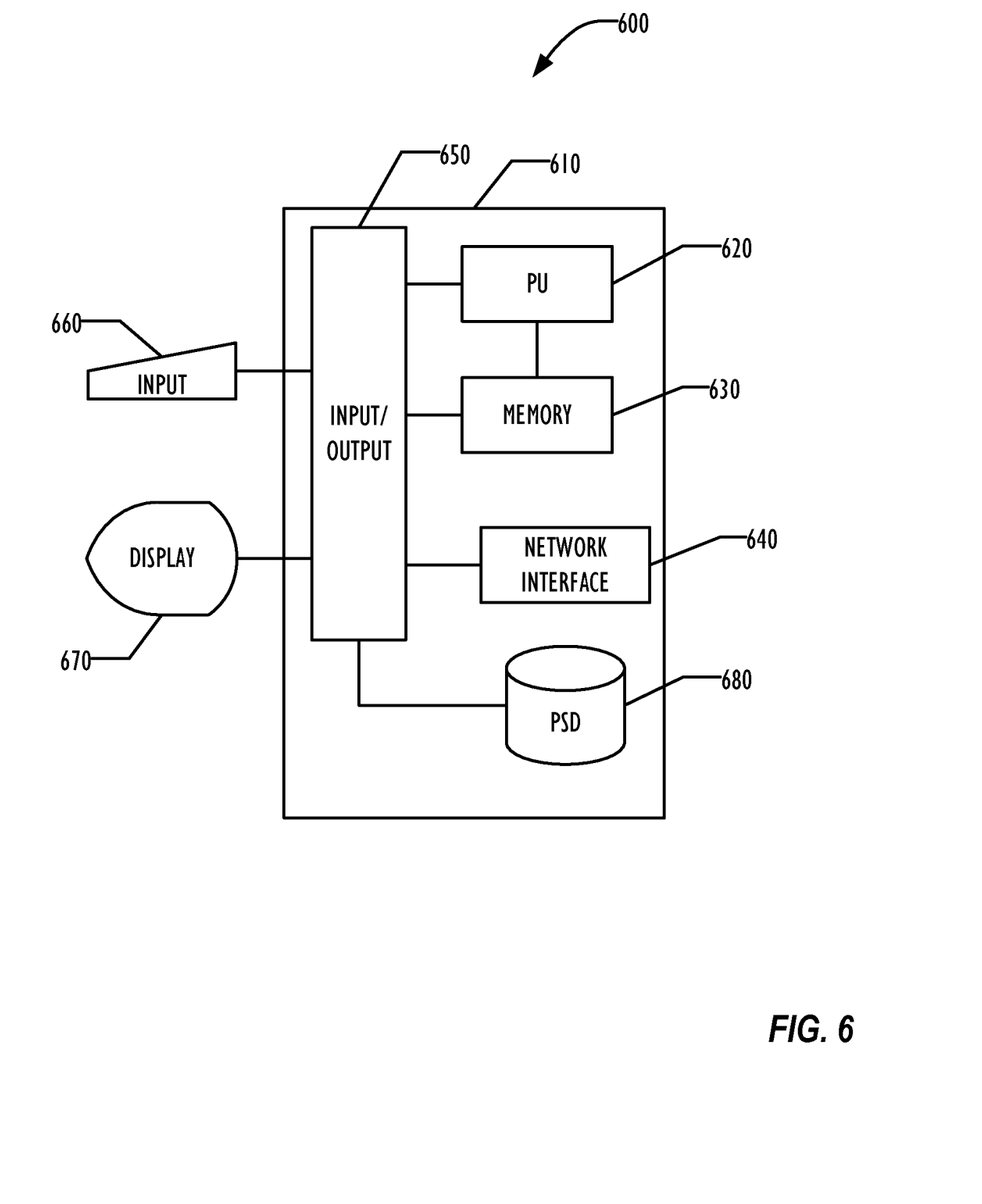
FIG. 6 illustrates, in block diagram form, an example computing device.

Referring now to FIG. 6, an example computer 600 for use in providing a CI scoping and graphical display of CMDB nodes as described above is illustrated in block diagram form. Example computer 600 comprises a system unit 610 which may be optionally connected to an input device or system 660 (e.g., keyboard, mouse, touch screen, etc.) and display 670. A program storage device (PSD) 680 (sometimes referred to as a hard disc) is included with the system unit 610. Also included with system unit 610 is a network interface 640 for communication via a network with other computing and corporate infrastructure devices (not shown). Network interface 640 may be included within system unit 610 or be external to system unit 610. In either case, system unit 610 will be communicatively coupled to network interface 640. Program storage device 680 represents any form of non-volatile storage including, but not limited to, all forms of optical and magnetic, including solid-state, storage elements, including removable media, and may be included within system unit 610 or be external to system unit 610. Program storage device 680 may be used for storage of software to control system unit 610, data for use by the computer 600, or both.

System unit 610 may be programmed to perform methods in accordance with this disclosure (examples of which are illustrated in FIGS. 3-5). System unit 610 comprises a processor unit (PU) 620, input-output (I/O) interface 650 and memory 630. Processing unit 620 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid-state memory. One of ordinary skill in the art will also recognize that PU 620 may also include some internal memory including, for example, cache memory.

Figure 7:
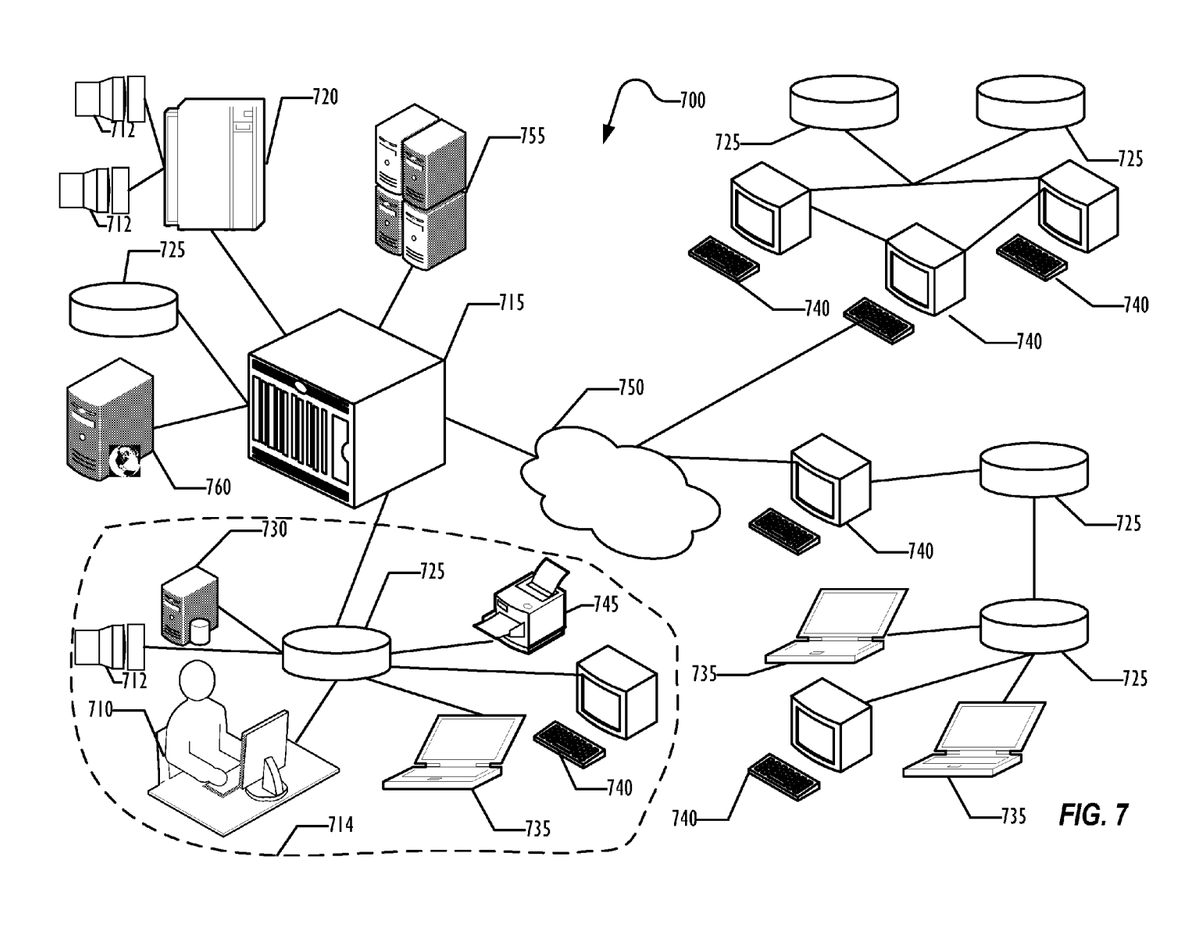
FIG. 7 illustrates, in block diagram form, an example network of an IT infrastructure according to one embodiment.

FIG. 7 illustrates an exemplary enterprise computing environment 700 wherein one embodiment of the present invention may be installed. The enterprise computing environment may be connected in any way known to the art, including using switches or routers 715 and networks 750. The CMDB may be installed and running on any one or more of the computing endpoints in communication with the network 750 illustrated in FIG. 7. As shown, the enterprise computing environment may include one or more computers, for example, mainframe computers 720, which each include or are connected to one or more storage devices 725, also referred to as direct access storage devices (DASD). A plurality of computer systems or terminals 712 may be coupled to the mainframe computer 720, wherein the computer systems or terminals 712 access data stored in the storage devices 725 coupled to or part of the mainframe computer 720. The enterprise computing environment may further include other resources, such as a printer 745.

A user 710 may use a terminal or workstation to access CMDB software to display information about the CMDB on a display associated with the workstation to make queries or to define CI scopes. The software generating the display on the user 710 workstation display or generating the query results or defining the CI scopes may execute on the workstation for the user 710 or on other computing resources of the enterprise computing environment 700, such as a mainframe 720, a web server 760, a database server 730, an application server 755, and other workstations 740 and portable computers 735.

The mainframe computer system 720 may be coupled to one or more other computer systems and/or computer networks, including other mainframe computer systems. The mainframe computer system 720 may be coupled locally to a computer system network 714 in a local area network (LAN) configuration, or may be coupled to one or more computer systems and/or networks through a wide area network (WAN), such as the network 750. As shown in FIG. 7, the mainframe computer system 720 may be coupled to a LAN 714, such as a PC-based or client/server based network via a router or switch 715 or directly coupled to the LAN 714. Similarly, the user 710 may access elements of the enterprise computing environment through the LAN 714 or the network 750. The LAN 714 may comprise a storage device or file server 725 coupled to one or more desktop computer systems 740, one or more portable computer systems 735 and possibly one or more computer systems or terminals 712. As also shown in FIG. 7, the mainframe computer 720 may also be coupled through a wide area network 750, to one or more additional local area networks, such as PC-based networks as shown. Each of the PC based networks may comprise one or more storage devices or file servers 725 and one or more of either desktop computer systems 740 or portable computer systems 735. The wide area network 750 may be any of various types, such as the Internet.

Each of the one or more mainframe computer systems 720, the computer systems 740 and 735, as well as file servers 725 may include various components as is standard in computer systems. For example, the mainframe computer system 720 may include one or more processors or CPUs, preferably multiple CPUs, as well as non-volatile memory, such as represented by elements 725, and various internal buses etc. as is well known in the art, as well as a display device. In a similar manner, each of the desktop computer systems 740 and/or portable computer systems 735, or other computer systems included within the enterprise, comprise various standard computer components including one or more CPUs, one or more buses, memory, a power supply, non-volatile memory, and a display, such as a video monitor or LCD display, such as describe above in the description of FIG. 6. The computer systems or terminals 712 may comprise standard "dumb" terminals as used with mainframes, i.e., may comprise a display and video hardware and/or memory for displaying data on the display provided from the mainframe computer system 720.

The mainframe computer system 720 may store a database comprising data which is desired to be accessible among a portion or all of the enterprise, e.g., is desired to be accessible by one or more of the computer systems 740 and 735. The database stored in the mainframe computer system 720 may be distributed among one or more of the various file servers 725 connected to the various computer systems 740 and 735. Thus, it is desired that the data comprising the database be distributed among the enterprise for ready access among multiple users. It is also possible that multiple different database management systems are used within the enterprise, e.g., one or more of the file servers 725 may store its own database which is desired to be replicated among various of the other file servers and/or the mainframe computer system 720.

One or more of the computer systems 720, 740, and 735 preferably include a storage medium on which computer programs according to the invention may be stored. In addition, the storage medium may be located in a first computer in which the programs are executed, or may be located in a second different computer that connects to the first computer over a network. In the latter instance, the second computer provides the program instructions to the first computer for execution. Also, the computer systems and terminals 712, 720, 725, 740, and 735 may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The storage medium preferably stores a software utility program or programs for graphically displaying database record organization characteristics as described herein. The software program(s) may be implemented in any of various ways, including procedure-based techniques, component-based techniques, and/or object-oriented techniques, among others. For example, the software program may be implemented using ActiveX® controls, C++ objects, Java® objects, Microsoft Foundation Classes (MFC), or other technologies or methodologies, as desired. (ACTIVEX is a registered trademark of the Microsoft Corporation. JAVA is a registered trademark of Sun Microsystems, Inc.) A computer system executing code and data from a memory medium comprises a means for graphically displaying database record organization according to the methods and/or block diagrams described below.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for use with a configuration management database (CMDB) containing configuration items (CIs) that represent elements of an information technology (IT) infrastructure, comprising:
   providing a graphical scope definition builder for generating CI scope definitions;
   identifying a CI scope definition to a user of the CMDB, wherein the CI scope definition is a pre-defined graph pattern that is associated with a CI class and conditions that includes a view template defining how to expand and is responsive to receiving a user-selected starting node representing a first element of the IT infrastructure, wherein identifying the CI scope definition includes:
      determining characteristics of the first element by determining a class key and an attribute condition list corresponding to the first element,
      identifying available CI scope definitions by matching the class key and the attribute condition list corresponding to the first element to a plurality of available CI scope definitions,
      displaying for the user multiple CI scope definitions from the plurality of the available CI scope definitions that match the class key and the attribute condition list corresponding to the first element, and
      receiving from the user a selection of a CI scope definition from the displayed multiple CI scope definitions;
   receiving a request from the user to expand a CI graph at the starting node;
   querying the CMDB responsive to the starting node and the selected CI scope definition; and
   expanding the CI graph at the starting node by adding CIs to the CI graph responsive to the querying to show CIs representing elements of the IT infrastructure that have a relationship to the first element defined by the selected CI scope definition.

2. The method of claim 1, wherein the act of displaying for the user the multiple CI scope definitions from the plurality of the available CI scope definitions that match the characteristics of the first element comprises:
   receiving the multiple CI scope definitions from a scope definition manager responsive to a request identifying the CI starting node; and
   displaying for the user the multiple CI scope definitions, and wherein the act of determining characteristics of the first element and the act of identifying the plurality of available CI scope definitions are performed by the scope definition manager.

3. The method of claim 1, wherein the act of displaying for the user the multiple CI scope definitions from the plurality of the available CI scope definitions that match the characteristics of the first element comprises:
   selecting the CI scope definition of the available CI scope definitions defining a scope starting node of a CI object class based on the user selection of the CI scope definition.

4. The method of claim 3, wherein the act of displaying for the user the multiple CI scope definitions from the plurality of the available CI scope definitions that match the characteristics of the first element comprises:
   selecting the CI scope definition of the available CI scope definitions defining a scope starting node of the CI object class with the CI attribute based on the user selection of the CI scope definition.

5. The method of claim 1, wherein the act of querying the CMDB responsive to the starting node and the selected CI scope definition comprises:
   requesting a query corresponding to the selected CI scope definition from a scope definition manager;
   requesting a query definition corresponding to the query from a query definitions manager; and
   querying the CMDB responsive to the query definition.

6. The method of claim 1, wherein the act of querying the CMDB responsive to the starting node and the selected CI scope definition is performed by a query engine.

7. The method of claim 1, wherein the act of adding CIs to the graph responsive to the act of querying the CMDB is performed by a user interface for the UI.

8. The method of claim 1, wherein the attribute condition list includes a set of name-value pairs, and wherein the name is an attribute name, and the value is a value for that attribute for which the scope is applicable.

9. A non-transitory computer readable medium with instructions for a programmable control device stored thereon wherein the instructions cause a programmable control device to:
   provide a graphical scope definition builder for generating configuration item (CI) scope definitions;
   identify a CI scope definition to a user of a configuration management database (CMDB), wherein the CI scope definition is a pre-defined graph pattern that is associated with a CI class and conditions that includes a view template defining how to expand and is responsive to receiving a user-selected starting node representing a first element of an information technology (IT) infrastructure, wherein identifying the CI scope definition includes:
      determining characteristics of the first element by determining a class key and an attribute condition list corresponding to the first element,
      identifying available CI scope definitions by matching the class key and the attribute condition list corresponding to the first element to a plurality of available CI scope definitions,
      displaying for the user multiple CI scope definitions from the plurality of the available CI scope definitions that match the class key and the attribute condition list corresponding to the first element, and receiving from the user a selection of a CI scope definition from the displayed multiple CI scope definitions;

receive a request from the user to expand a CI graph at the starting node;

query the CMDB responsive to the starting node and the selected CI scope definition; and expand the CI graph at the starting node by adding CIs to the CI graph responsive to the querying to show CIs representing elements of the IT infrastructure that have a relationship to the first element defined by the selected CI scope definition.

10. The computer readable medium of claim 9, wherein the attribute condition list includes a set of name-value pairs, and wherein the name is an attribute name, and the value is a value for that attribute for which the scope is applicable.

11. A networked computer system comprising:

a plurality of computers communicatively coupled to the networked computer system and collectively configured to:

provide a graphical scope definition builder for generating configuration item (CI) scope definitions;

identify a CI scope definition to a user of a configuration management database (CMDB), wherein the CI scope definition is a pre-defined graph pattern that is associated with a CI class and conditions that includes a view template defining how to expand and is responsive to receiving a user-selected starting node representing a first element of an information technology (IT) infrastructure, wherein identifying the CI scope definition includes:

determining characteristics of the first element by determining a class key and an attribute condition list corresponding to the first element, identifying available CI scope definitions by matching the class key and the attribute condition list corresponding to the first element to a plurality of available CI scope definitions, displaying for the user multiple CI scope definitions from the plurality of the available CI scope definitions that match the class key and the attribute condition list corresponding to the first element, and receiving from the user a selection of a CI scope definition from the displayed multiple CI scope definitions;

receive a request from the user to expand a CI graph at the starting node;

query the CMDB responsive to the starting node and the selected CI scope definition; and expand the CI graph at the starting node by adding CIs to the CI graph responsive to the querying to show CIs representing elements of the IT infrastructure that have a relationship to the first element defined by the selected CI scope definition.

12. The networked computer system of claim 11, wherein the attribute condition list includes a set of name-value pairs, and wherein the name is an attribute name, and the value is a value for that attribute for which the scope is applicable.

13. A computer system for use with a configuration management database (CMDB) containing configuration items (CIs) that represent elements of an information technology (IT) infrastructure, comprising:

a graphical user interface, configured to display a first graph of CIs responsive to requests from a user;

a query engine, communicatively coupled to the graphical user interface and configured to generate a second graph of CIs responsive to a request from the user to expand the first graph of CIs at a selected CI of the first graph according to a user-selected predefined CI scope of a plurality of predefined CI scopes, wherein the plurality of predefined CI scopes are based on and responsive to receiving the selected CI of the first graph;

a query definition manager, communicatively coupled to the query engine and configured to generate a query definition responsive to a request to retrieve a query definition from the query engine;

a graphical scope builder, communicatively coupled to the graphical user interface, configured to allow the user to generate a graphical scope definition comprising a starting CI and a link between the starting CI and a second CI, wherein the scope definition is a pre-defined graph pattern that is associated with a CI class and conditions that includes a view template defining how to expand and further comprises a class key and an attribute condition list corresponding to the starting CI; and a scope definition manager, communicatively coupled to the graphical user interface and the query definition manager and configured to:

identify to the graphical user interface a first scope associated with the selected CI of the plurality of predefined CI scopes by matching the class key and the attribute condition list corresponding to the starting CI, responsive to a request from the user to expand the first graph of CIs at the selected CI; and identify a query to the query engine corresponding to the first scope responsive to a request from the query engine, wherein the graphical user interface displays a predefined scope of the plurality of predefined scopes corresponding to the selected CI by matching the class key and the attribute condition list corresponding to the starting CI upon selection by the user.

14. The system of claim 13, wherein the plurality of predefined CI scopes is stored in the CMDB.

15. The system of claim 13, wherein the scope definition is stored by the scope definition manager as one of the plurality of predefined CI scopes.

16. The system of claim 15, wherein the link corresponds to a relationship between an element of the IT infrastructure corresponding to the starting CI and an element of the IT infrastructure corresponding to the second CI.

17. The system of claim 16, wherein the link is an optional link.

18. The system of claim 15, wherein the scope definition modifies a predefined scope of the plurality of predefined CI scopes.

19. The computer system of claim 13, wherein the attribute condition list includes a set of name-value pairs, and wherein the name is an attribute name, and the value is a value for that attribute for which the scope is applicable.

* * * * *